(12) United States Patent
Chen et al.

(10) Patent No.: US 10,966,080 B1
(45) Date of Patent: Mar. 30, 2021

(54) METHODS AND/OR SYSTEMS FOR ACTIVATION AND/OR CONFIGURATION OF AN ELECTRONIC SUBSCRIBER IDENTITY MODULE (ESIM)

(71) Applicant: Verizon Patent and Licensing Inc., Arlington, VA (US)

(72) Inventors: Zhengfang Chen, Millburn, NJ (US); Tarun Verma, Flemington, NJ (US); Mauricio Pati Caldeira De Andrada, South Plainfield, NJ (US); Thomas W. McArtney, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/670,865

(22) Filed: Oct. 31, 2019

(51) Int. Cl.
| | |
|---|---|
| *H04B 1/38* | (2015.01) |
| *H04W 8/18* | (2009.01) |
| *H04W 8/20* | (2009.01) |
| *H04W 64/00* | (2009.01) |
| *H04W 60/04* | (2009.01) |
| *H04W 8/22* | (2009.01) |
| *H04W 4/60* | (2018.01) |

(52) U.S. Cl.
CPC ............ *H04W 8/183* (2013.01); *H04W 4/60* (2018.02); *H04W 8/205* (2013.01); *H04W 8/22* (2013.01); *H04W 60/04* (2013.01); *H04W 64/003* (2013.01)

(58) Field of Classification Search
CPC ..... H04W 8/205; H04W 4/50; H04W 12/004; H04W 64/00; H04W 8/22; H04W 60/00; H04W 8/183
See application file for complete search history.

(56) References Cited

U.S. PATENT DOCUMENTS

| | | | |
|---|---|---|---|
| 9,099,080 B2 * | 8/2015 | Courtney, III | G06Q 30/0259 |
| 9,924,487 B2 * | 3/2018 | Jayaraman | H04W 8/16 |
| 10,484,865 B2 * | 11/2019 | Park | H04L 63/0428 |
| 10,771,943 B1 * | 9/2020 | Bruner | H04L 9/0897 |
| 2020/0367043 A1 * | 11/2020 | Anand | H04W 12/06 |

\* cited by examiner

*Primary Examiner* — Nhan T Le

(57) ABSTRACT

A device identifies device model information for the device. The device provides, to a first server device, an activation request that includes the device model information to activate an embedded subscriber identity module (eSIM) for the device. The device receives, from the first server device, an activation response that includes an eSIM profile identifier and location information that is to be used to identify eSIM profile configuration data (PCD). The device provides, to a second server device, a configuration request that includes an eSIM component identifier that identifies the eSIM of the device. The second server device is provided with the configuration request based on the location information. The device receives, from the second server device, a configuration response that includes the eSIM PCD. The device configures, by using the eSIM PCD, the eSIM with the eSIM profile.

20 Claims, 9 Drawing Sheets

METHODS AND/OR SYSTEMS FOR ACTIVATION AND/OR CONFIGURATION OF AN ELECTRONIC SUBSCRIBER IDENTITY MODULE (ESIM)

BACKGROUND

A subscriber identity module (SIM) card is an integrated circuit that is capable of securely storing an international mobile subscriber identity (IMSI) and a related key. An embedded SIM (eSIM) is a form of programmable SIM that is embedded directly into a device, and that can be remotely provisioned such that an operator can be added or removed without needing to physically replace the eSIM on the device.

DETAILED DESCRIPTION OF PREFERRED EMBODIMENTS

Figure 1A:
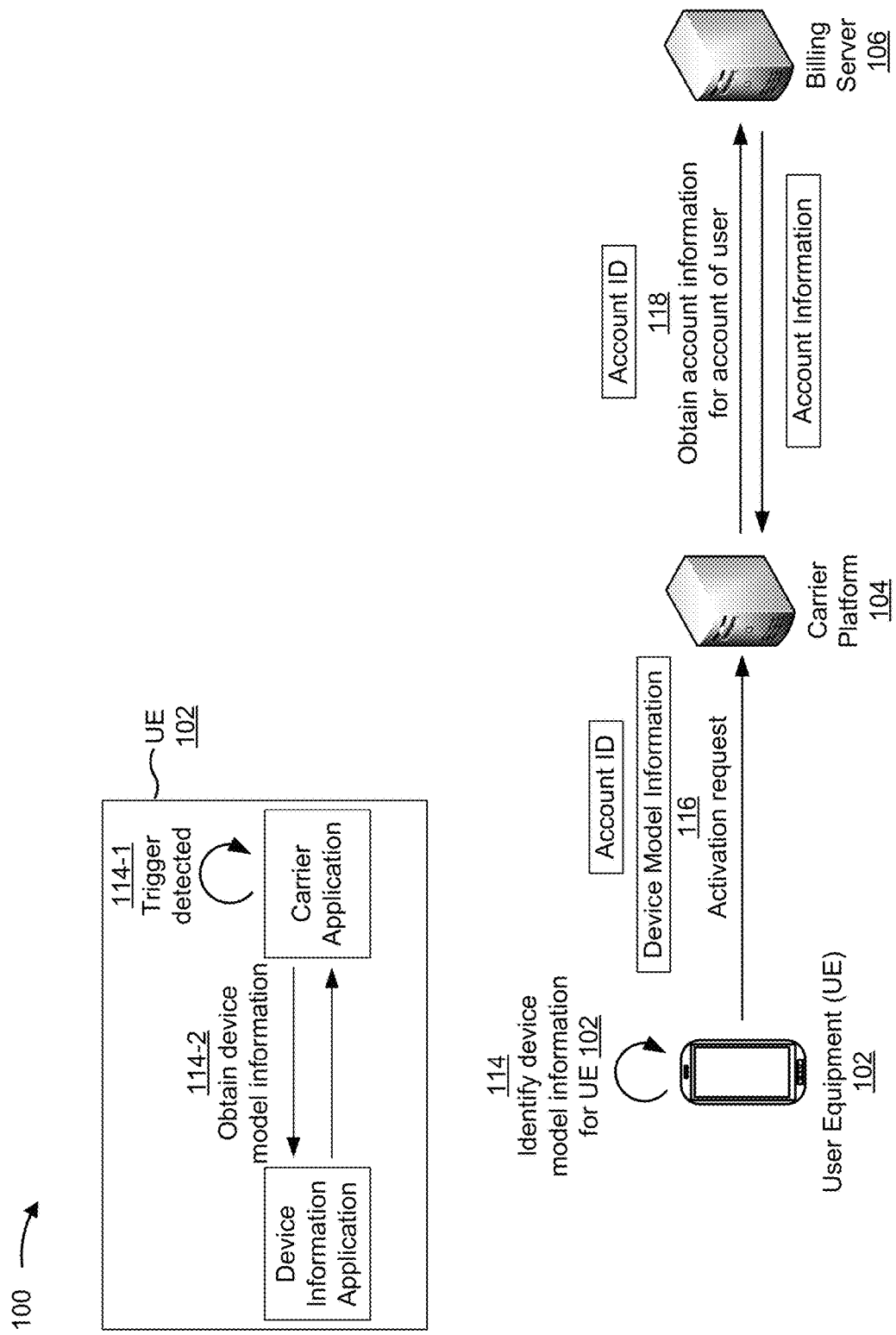
FIGS. 1A-1E are diagrams of one or more example implementations described herein.

The following detailed description of example implementations refers to the accompanying drawings. The same reference numbers in different drawings may identify the same or similar elements.

An embedded SIM (eSIM) is a form of programmable SIM that is embedded directly into a user device. The eSIM can be remotely provisioned with an eSIM profile that corresponds to an account that a user has with a service provider (e.g., a telecommunication provider, a network operator (MNO), a carrier, and/or the like).

To provision and/or identify one or more configuration items (CIs) of the eSIM, the user must manually submit a unique device identifier (an international mobile equipment identity (IMEI) and/or the like) of the user device. For example, the user may interact with an interface of the user device to input the unique device identifier into a field of an application that may be used to provision and/or identify the one or more CIs of the eSIM. The application may be an application that is operated by a vendor/manufacturer of an operating system of the user device.

However, for security and/or privacy reasons, the vendor/manufacturer of the operating system of the user device has prevented release of an application programming interface (API) that would allow a third party application (e.g., a carrier application operated by the service provider of the user) to assist in remotely provisioning eSIMs. Without the API to allow the user device to communicate directly with a carrier platform associated with the service provider, one or more devices used to provision and/or identify the one or more CIs of the eSIM (the user device, a backend server associated with the vendor/manufacturer, other network devices associated with the service provider, and/or the like) will inefficiently and/or ineffectively expend resources (e.g., processing resources, network resources, and/or the like) while provisioning and/or identifying the one or more CIs of the eSIM on the user device.

Some implementations described herein include a user equipment (UE) to perform a first set of actions (described further herein) to cause an embedded subscriber identity module (eSIM) of the UE to be remotely activated and configured. For example, the UE (e.g., using a carrier application) may identify device model information that identifies a model of the UE and/or a version associated with the model. In this case, the UE may provide, to a carrier platform, an activation request to activate the eSIM of the UE. The activation request may include the device model information. Additionally, the carrier platform may perform a second set of actions (described further herein) that cause an eSIM profile identifier for an eSIM profile to be assigned to the eSIM and that cause eSIM profile configuration data for the eSIM profile (which may be used to configure the eSIM with the eSIM profile) to be made available to the UE.

Furthermore, the UE may receive, from the carrier platform, an activation response that includes an activation code that may be used to activate the eSIM of the UE. The activation code may include the eSIM profile identifier and location information that is to be used to identify the eSIM profile configuration data. In this case, the UE may provide, to a remote SIM provisioning (RSP) platform, a configuration request that includes an eSIM component identifier that identifies the eSIM of the device. The configuration request may be provided to the RSP platform using the location information (e.g., which may include a fully qualified domain name (FQDN). Additionally, a data structure associated with the RSP platform may store the eSIM profile configuration data, and the RSP platform may use information included in the configuration request to reference the data structure to identify the eSIM profile configuration data, and to provide the UE with a configuration response that includes the eSIM profile configuration data. This may allow the UE to use the eSIM profile configuration data to configure the eSIM with the eSIM profile.

In this way, the first set of actions performed by the UE cause the eSIM to be configured with the eSIM profile. Additionally, by performing actions that cause the eSIM to be remotely provisioned without using the unique device identifier of the UE as part of an activation procedure, the UE efficiently and/or effectively utilizes resources of the UE, resources of other platforms and/or devices, and/or the like. For example, the UE conserves resources (e.g., processing resources, network resources, memory resources, and/or the like) that would otherwise be used to transmit the unique device identifier over a network, reduces a number of over the air transmissions made by devices used to configure the eSIM (e.g., relative to an inferior solution that does not use one or more application programming interfaces (APIs) described herein to send and/or receive data, relative to an inferior solution that uses the unique device identifier as part of the activation procedure, and/or the like), and/or the like. Furthermore, implementing a solution that does not require the unique device identifier to be sent over a network to configure the eSIM improves security and/or privacy concerns that might otherwise arise were the unique device identifier to be intercepted by an unauthorized party.

FIGS. 1A-1E are diagrams of one or more example implementations 100 described herein. For example, the one or more example implementations 100 may include a user equipment (UE) 102, a carrier platform 104, a billing server 106, a group of data storage devices 108 that are associated with carrier platform 104 (shown as Data Storage Device 108-1 and Data Storage Device 108-2), an electronic telephone number inventory (eTNI) server 110, and a remote subscriber identity module (SIM) provisioning (RSP) platform 112. As shown in FIGS. 1A-1E, UE 102 may perform a set actions (described herein) to cause an embedded subscriber identity module (eSIM) of UE 102 to be remotely provisioned.

As shown in FIG. 1A, and by reference number 114, UE 102 may identify device model information. For example, UE 102 may identify device model information that may be used to configure the eSIM of UE 102 with an eSIM profile that corresponds to an account that a user has with a service provider.

The device model information may include information that identifies a device model, information that identifies a version associated with the device model, and/or other information that generically identifies UE 102. In some implementations, the device model information may exclude a unique device identifier of UE 102, such as an international mobile equipment identity (IMEI) and/or any other identifier capable of uniquely identifying UE 102. As used herein, an identifier may uniquely identify a device (e.g., UE 102) if the identifier can be used to identify the device and cannot be used to identify one or more other devices (e.g., including one or more other UEs 102 that share the same device model information).

In some implementations, before UE 102 identifies the device model information, the user (e.g., a subscriber of the service provider) may purchase UE 102 and may power on the device. For example, a display screen of UE 102 may, as part of a boot-up procedure, prompt the user to select the service provider. When the user selects the service provider, the display screen may update to display a homepage or desktop of UE 102. In some cases, the boot-up procedure may also cause a carrier application to automatically launch and be displayed via the display screen. In other cases, the user may manually launch the carrier application. Additionally, the user may log into the account that the user has with the service provider, may create a new account with the service provider, may add one or more other users to the account, and/or the like.

In some implementations, UE 102 may identify the device model information based on a trigger condition being satisfied. The trigger condition that may cause UE 102 to identify the device model information may include a first indication that the boot-up procedure of UE 102 has been completed, a second indication that the carrier application has been launched on UE 102, a third indication that the user has logged into the account associated with the carrier application, and/or indications of one or more other user interface interactions and/or events on UE 102 that may precede the configuration and/or activation of the eSIM of UE 102.

In some implementations, UE 102 may use the carrier application to identify the device model information. For example, and as shown by reference number 114-1, UE 102 (e.g., using the carrier application) may detect that a trigger condition has been satisfied. As shown by reference number 114-2, UE 102 may cause the carrier application to obtain the device model information from a device information application that stores the device information locally on UE 102. In this case, UE 102 may cause the carrier application to provide a device model information request to the device information application. The device model request may be provided using a first interface (e.g., a first application programming interface (API) and/or another type of communication interface). Additionally, UE 102 may cause the device information application to reference a data structure to identify the device model information and may cause the device information application to provide the carrier application with a device model information response that includes the device model information.

Additionally, or alternatively, UE 102 may identify the device model information using one or more other applications. For example, UE 102 may identify the device model using a logical profile assistant (LPA) and/or another application associated with UE 102.

As shown by reference number 116, UE 102 may provide an activation request to carrier platform 104. For example, UE 102 may use a second interface (e.g., a second API and/or another type of communication interface) to provide carrier platform 104 with an activation request to activate the eSIM of UE 102. The activation request may include the device model information of UE 102, an account identifier of the account that the user has with the service provider, account information for the account, and/or the like. Carrier platform 104 may be operated by the service provider (e.g., and not a vendor/manufacturer of an operating system of UE 102).

In the example shown, UE 102 may provide carrier platform 104 with an activation request that includes the device model information and the account identifier for the account that the user has with the service provider. As another example, the user may create a new account with the service provider after powering on UE 102. In this example, the user may interact with an interface of the carrier application to create the new account, and may input account information, such as login information, address information, billing information, user preferences information, and/or the like. In this example, UE 102 may provide carrier platform 104 with the account information as part of the activation request (e.g., in addition to the device model information and/or the account identifier).

As shown by reference number 118, carrier platform 104 may obtain, from billing server 106, the account information for the account that the user has with the service provider. For example, carrier platform 104 may obtain the account information that may be used to configure the eSIM in a manner that provides UE 102 with access to a services package that is linked to the account of the user. The services package may include one or more services that the user has signed up for when creating the account, one or more services that the user has signed up for after creating the account, one or more services that another authorized user of the account has signed up for, and/or the like. A description of how the account information is used to configure the eSIM in a manner that provides UE 102 with access to the services package is provided further herein.

Continuing with the example, to obtain the account information, carrier platform 104 may provide billing server 106 with an account information request that includes the account identifier of the user (and/or any other authentication information that may be needed). This may cause billing server 106 to use the account identifier to identify the account information and to provide carrier platform 104 with an account information response that includes the account information. In some implementations, carrier platform 104 may already have obtained the account information from UE 102 (e.g., as part of an activation request, such as when a user creates a new account while activating an eSIM of a particular UE 102).

In this way, UE 102 causes carrier platform 104 to be provided with information needed to activate the eSIM (e.g., the device model information and/or the account information).

Figure 1B:
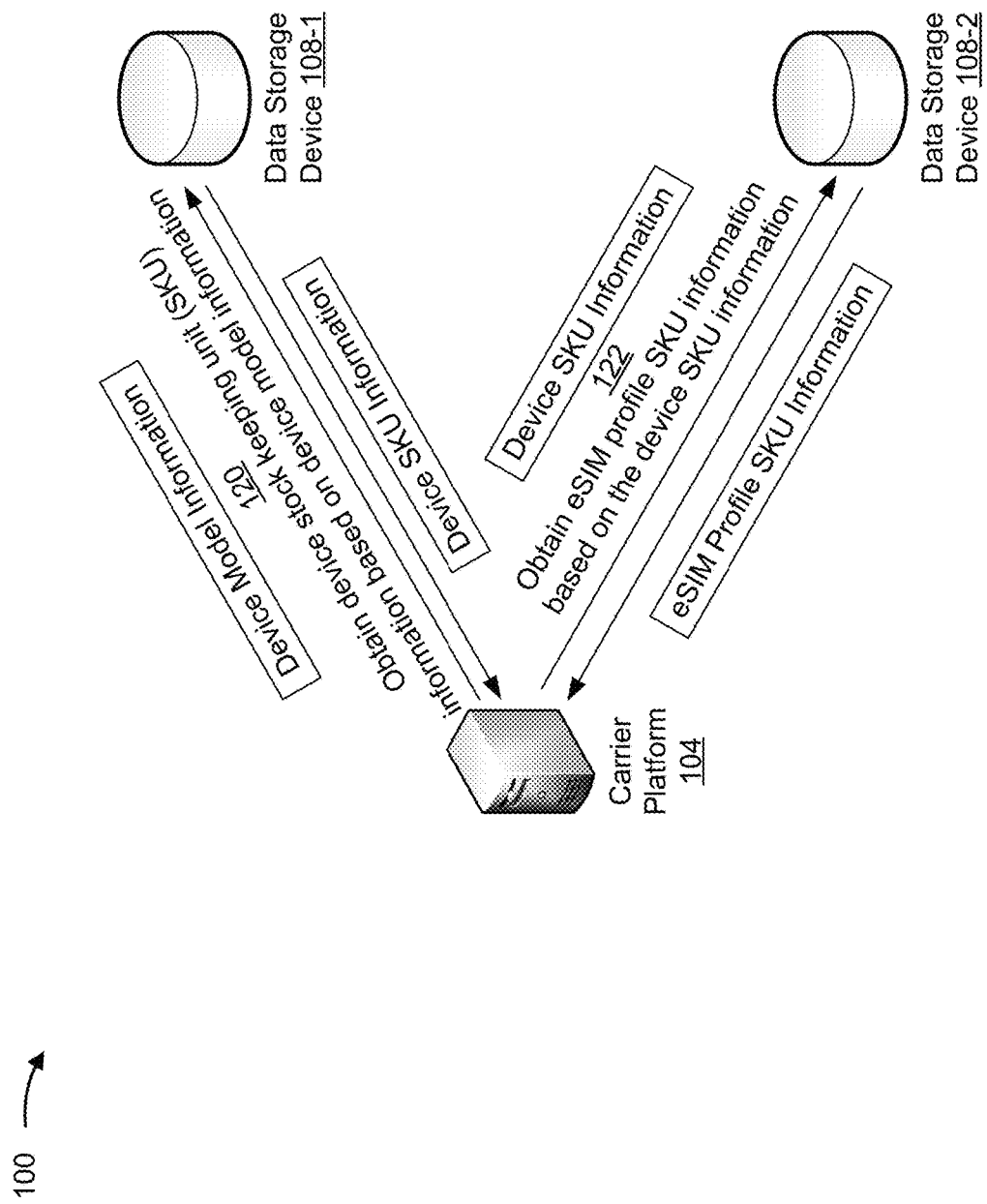

As shown in FIG. 1B, and by reference number 120, carrier platform 104 may obtain device stock keeping unit (SKU) information based on the device model information. The device SKU information may include information that identifies a type of eSIM on UE 102, information that identifies a version of a particular type of eSIM on UE 102, and/or the like. The eSIM may include an embedded universal integrated circuit card (EUICC), an embedded integrated circuit card (EICC), a secure element, and/or the like. While some implementations described herein refer to the eSIM, it is to be understood that this is provided by way of example. In practice, one or more implementations described herein may be implemented with a SIM card, such as a SIM card that includes a UICC, an ICC, a secure element, and/or the like.

To obtain the device SKU information, carrier platform 104 may use the device model information to reference a data structure associated with data storage device 108-1. For example, the data structure may be used to store a set of device SKU information for various types of devices. The set of device SKU information may be stored in association with a corresponding set of device model information for the various types of devices. In this case, carrier platform 104 may use the device model information (e.g., as terms of a search query) to reference the data structure to cause data storage device 108-1 to identify and provide carrier platform 104 with the device SKU information that corresponds to the model that matches the model of UE 102.

As shown by reference number 122, carrier platform 104 may obtain eSIM profile SKU information based on the device SKU information. The eSIM profile SKU information may include an eSIM profile type identifier that identifies a type of eSIM profile (e.g., a type of eSIM profile may be compatible with a particular eSIM), an eSIM profile version identifier that identifies a version of a particular eSIM profile, and/or the like.

To obtain the eSIM profile SKU information, carrier platform 104 may use the device SKU information to search a data structure associated with data storage device 108-2. For example, the data structure may be used to store a set of eSIM profile SKU information for eSIM profiles that are compatible with different types of eSIMs, different versions of eSIMs, different hardware specifications of eSIMs, and/or the like. The set of eSIM profile SKU information may be stored in association with a corresponding set of device SKU information for devices that include eSIMs that are compatible with particular eSIM profiles. In this case, carrier platform 104 may use the device SKU information (e.g., as terms of a search query) to reference the data structure associated with data storage device 108-2 to cause data storage device 108-2 to identify and provide carrier platform 104 with the eSIM profile SKU information that is compatible with the eSIM of UE 102 (and that corresponds to the device SKU information).

In this way, carrier platform 104 uses the device model information (e.g., which excludes the unique device identifier of UE 102) to obtain the eSIM profile SKU information that identifies a type of eSIM profile (and/or a version of eSIM profile) that is compatible with the eSIM of UE 102.

Figure 1C:
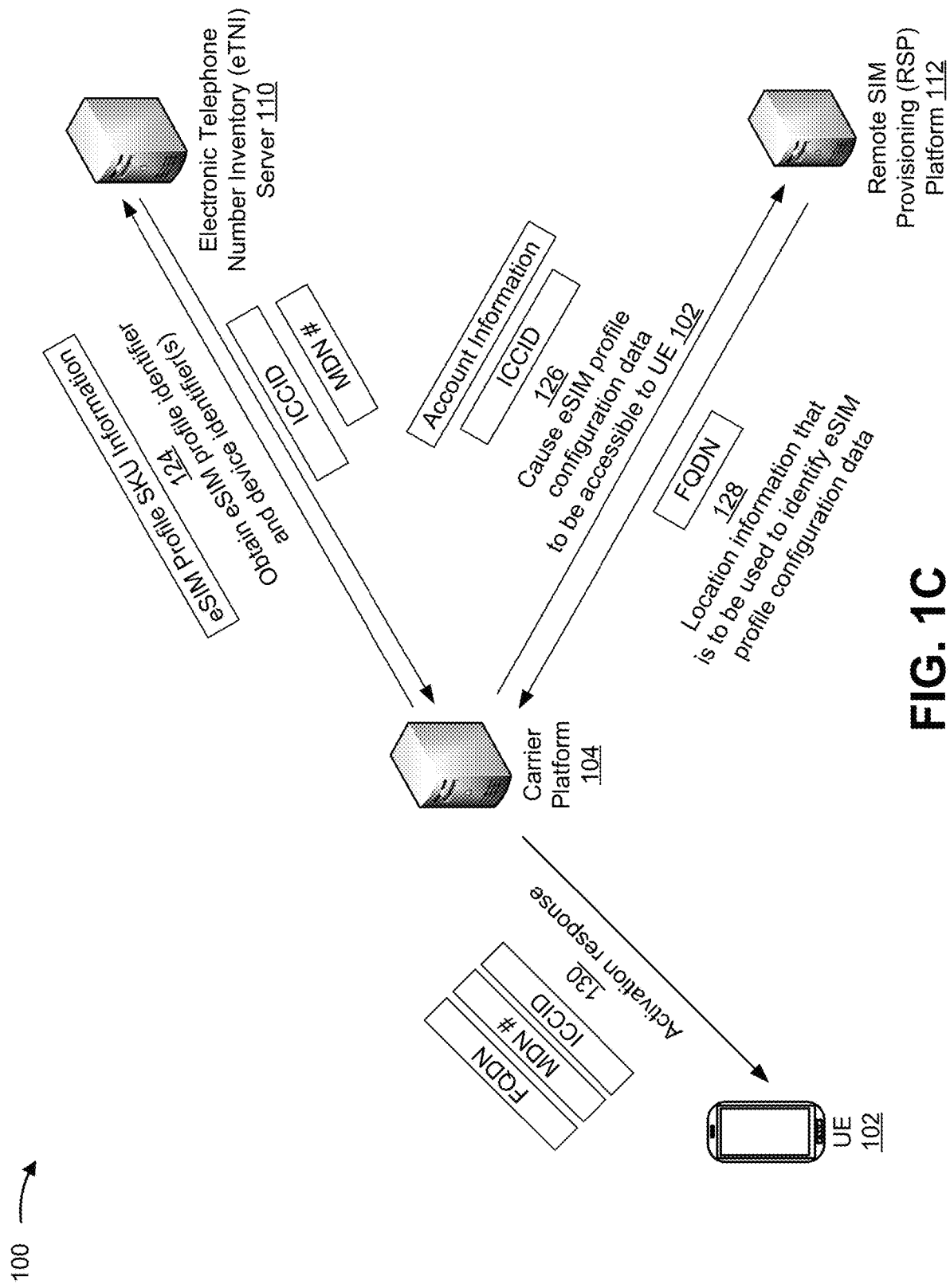

As shown in FIG. 1C, and by reference number 124, carrier platform 104 may obtain an eSIM profile identifier for an eSIM profile and one or more device identifiers associated with UE 102. For example, carrier platform 104 may use the eSIM profile SKU information to obtain, from eTNI server 110, an eSIM profile identifier for the eSIM profile that is compatible with the eSIM of UE 102, and one or more device identifiers that have been assigned to UE 102 (and/or to the account the user has with the service provider).

The eSIM profile identifier may identify an eSIM profile that is compatible with the eSIM of UE 102 and/or that has been assigned to the eSIM of UE 102. The eSIM profile identifier may, for example, include an ICC identifier (ICCID) and/or a similar type of identifier. In the example shown, the eSIM profile identifier may include an ICCID that identifies the eSIM profile. In some cases, the eSIM profile identifier may be used as a pointer to a specific memory location used to store eSIM profile configuration data. The one or more other device identifiers may include a mobile directory number (MDN), a mobile identification number (MIN), a mobile station identifier (MSID), and/or the like.

In some implementations, carrier platform 104 may cause eTNI server 110 to assign the eSIM profile identifier to the eSIM of UE 102 and/or to assign the one or more device identifiers to UE 102. For example, carrier platform 104 may use a third interface (e.g., a third API and/or another type of communication interface) to provide, to eTNI server 110, the eSIM profile SKU information that identifies the type of eSIM profile and/or the version of eSIM profile to which the eSIM of UE 102 is compatible. In this case, eTNI server 110 may have access to a data structure that associates eSIM profile identifiers for available eSIM profiles with corresponding eSIM profile SKU information. Additionally, eTNI server 110 may use the eSIM profile SKU information received from carrier platform 104 to reference the data structure to identify a set of eSIM profile identifiers associated with available eSIM profiles (e.g., which are compatible with the eSIM of UE 102). In this case, eTNI server 110 may assign an eSIM profile to the eSIM of UE 102, such that an eSIM profile identifier for the eSIM profile is reserved specifically for the eSIM of UE 102. Furthermore, eTNI server 110 may reference the data structure (or another data structure) that includes a list of available device identifiers (e.g., a list of available MDNs) and may assign the one or more device identifiers to UE 102.

As shown by reference number 126, carrier platform 104 may interact with RSP platform 112 to cause eSIM profile configuration data to be made available to (e.g., downloadable by) UE 102. For example, carrier platform 104 may provide, to RSP platform 112, a set of instructions to cause RSP platform 112 to perform one or more actions to make eSIM profile configuration data available to UE 102.

The set of instructions may include the eSIM profile identifier for the eSIM of UE 102, the account information for the account of the user (e.g., which may have been obtained from billing server 106, as described above), a message indicating to make the eSIM profile configuration data available to UE 102, an eSIM profile configuration file, and/or the like. The eSIM profile configuration file may include a set of instructions capable of providing the eSIM of UE 102 with access to one or more services of the services package linked to the account of the user, instructions capable of restricting access of the eSIM to one or more services of the services package, instructions capable of monitoring and/or reporting data usage associated with one or more services of the services package, and/or the like.

In some implementations, carrier platform 104 may cause the eSIM profile identifier to be made available to UE 102. For example, in some cases, the eSIM profile configuration data may include only the eSIM profile identifier. In these cases, carrier platform 104 may provide RSP platform 112 with the eSIM provider identifier to cause RSP platform 112 to make the eSIM profile identifier accessible to UE 102 via a fourth interface (e.g., a fourth API and/or another type of communication interface), such as a fourth interface that permits UE 102 to download the eSIM profile identifier and/or that permits carrier platform 104 to provide UE 102 with the eSIM profile identifier.

Additionally, or alternatively, carrier platform 104 may cause the eSIM profile configuration file to be made available to UE 102. For example, in other cases, the eSIM profile configuration data may include the eSIM profile configuration file (e.g., in addition to the eSIM profile identifier, instead of the eSIM profile identifier, and/or the like). In these cases, carrier platform 104 may provide RSP platform 112 with the eSIM profile identifier and the account information of the user.

Additionally, RSP platform 112 may process the account information to obtain and/or identify services package data for the services package that may be used as part of the eSIM profile configuration file. As an example, RSP platform 112 may process the account information to identify a price plan for the account of the user and may use the price plan to obtain and/or identify the services package data. In this example, the price plan may specify that the user has purchased a particular quantity of data. Furthermore, RSP platform 112 may obtain and/or identify, as part of the services package, a service feature that ensures that UE 102 will have access to the particular quantity of data. For example, RSP platform 112 may obtain services package data for the services package by providing a request to a network device (e.g., a home subscriber server (HSS), a unified data manager (UDM), and/or the like) that stores the services package data to cause the network device to provide RSP platform 112 with a response that includes the services package data. In this case, RSP platform 112 may configure the eSIM profile configuration file with the services package data, such that the eSIM profile configuration file is able to provide UE 102 with access to one or more services defined by the services package. Additionally, RSP platform 112 may cause the eSIM profile configuration file to be made available to UE 102 via the fourth interface.

As shown by reference number 128, RSP platform 112 may provide carrier platform 104 with location information that is to be used to identify the eSIM profile configuration data. The location information may include a uniform resource locator (URL), a domain name (DN), a fully qualified domain name (FQDN), and/or the like.

As shown by reference number 130, carrier platform 104 may provide an activation response to UE 102. For example, carrier platform 104 may use the second interface to provide UE 102 with an activation response that includes the eSIM profile identifier, the one or more device identifiers, the location information that is to be used to identify the eSIM profile configuration data, and/or the like. In the example shown, carrier platform 104 may provide UE 102 with the eSIM profile identifier, the MDN of UE 102, and a FQDN that may permit UE 102 to obtain the eSIM profile configuration data (as described further herein).

In this way, UE 102 is provided with an activation response that includes information that may be used to activate the eSIM of UE 102 (e.g., without UE 102 having to include a unique device identifier in the activation request, without having to provide the unique device identifier to carrier platform 104, and/or the like).

Figure 1D:
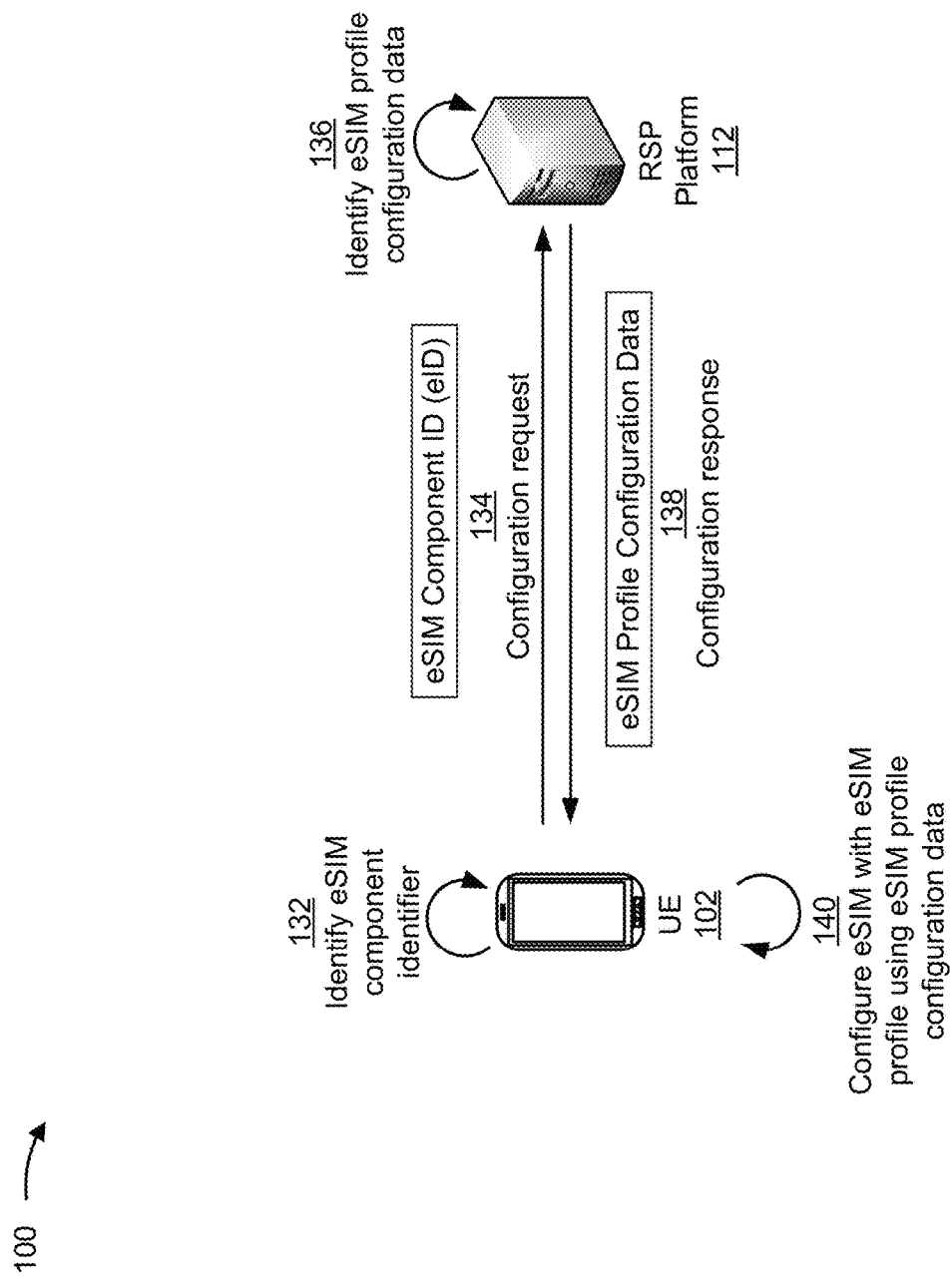

As shown in FIG. 1D, and by reference number 132, UE 102 may identify an eSIM component identifier. For example, UE 102 (e.g., using a logical profile assistant (LPA) and/or another software element of UE 102) may identify an eSIM component identifier by referencing a data structure associated with UE 102. The eSIM component identifier may be used to identify the eSIM of UE 102 and may include an eICCID, an eUICCID, and/or the like. In the example shown, where the eSIM profile identifier is an ICCID that identifies the eSIM profile, an eICCID or an eUICCID (shown as eID) may be used as the eSIM component identifier to identify the eSIM of UE 102.

As shown by reference number 134, UE 102 may provide RSP platform 112 with a configuration request. For example, UE 102 may provide a configuration request to RSP platform 112 via a fifth interface. The fifth interface may include a fifth API and/or another type of communication interface. For example, the fifth interface may include a secure interface, an interface released as part of a specification associated with a global organization that establishes industry standards that the service provider must abide by (e.g., an ES9 interface and/or a similar type of interface), and/or the like. The configuration request may include the eSIM component identifier. In some implementations, UE 102 may use the location information (e.g., the FQDN) to provide RSP platform 112 with the configuration request (e.g., by visiting a website hosted by RSP platform 112). In the example shown, UE 102 may provide RSP platform 112 with a configuration request that includes an eICCID (shown as eID).

As shown by reference number 136, RSP platform 112 may identify the eSIM profile configuration data. For example, RSP platform 112 may use the eSIM profile identifier (e.g., the ICCID) to identify the eSIM profile configuration data. The ICCID may have been previously provided to RSP platform 112 (see, e.g., FIG. 1C). The eSIM profile configuration data may be stored in association with a corresponding eSIM profile identifier. In this case, RSP platform 112 may verify that UE 102 is permitted to access the eSIM profile configuration data by comparing the eSIM profile identifier with the corresponding eSIM profile identifier that is stored in association with the eSIM profile configuration data.

As shown by reference number 138, RSP platform 112 may provide UE 102 with a configuration response. For example, RSP platform 112 may provide, to UE 102 and via the fifth interface, a configuration response that includes the eSIM profile configuration data.

In some implementations, UE 102 may obtain the eSIM profile configuration data (e.g., without a configuration request-configuration response interaction with RSP platform 112). For example, UE 102 may use the FQDN to access a website that allows UE 102 to download the eSIM profile configuration data. In this case, UE 102 may input credential information (e.g., the account information of the user, the eSIM profile identifier, the eSIM component identifier, and/or the like) to access a page of the website that permits UE 102 to download the eSIM profile configuration data.

As shown by reference number 140, UE 102 may configure the eSIM with the eSIM profile using the eSIM profile configuration data. In some cases, such as when the eSIM profile configuration data excludes the eSIM configuration file, UE 102 may configure the eSIM such that a set of connection parameters (e.g., a set of UICC parameters, which may include the eSIM profile identifier of the eSIM) may be used as part of a connection procedure when UE 102 is to access one or more services via a network. For example, UE 102 may store a set of UICC connection parameters, which may include the eSIM profile identifier of the eSIM, such that the set of UICC connection parameters may be used as part of an attachment procedure that allows UE 102 to connect to a network, such as a fourth generation (4G) network, a fifth generation (5G) network, and/or the like.

In other cases, such as when the eSIM profile configuration data includes the eSIM profile configuration file, UE 102 may execute the eSIM profile configuration file to configure the eSIM of UE 102. By configuring the eSIM, UE 102 may be able to access the services package that includes the one or more services that are linked to the account of the user.

In this way, UE 102 configures the eSIM with the assigned eSIM profile (e.g., without UE 102 having to include the unique device identifier in the activation request, without having to provide the unique device identifier to carrier platform 104, and/or the like).

Figure 1E:
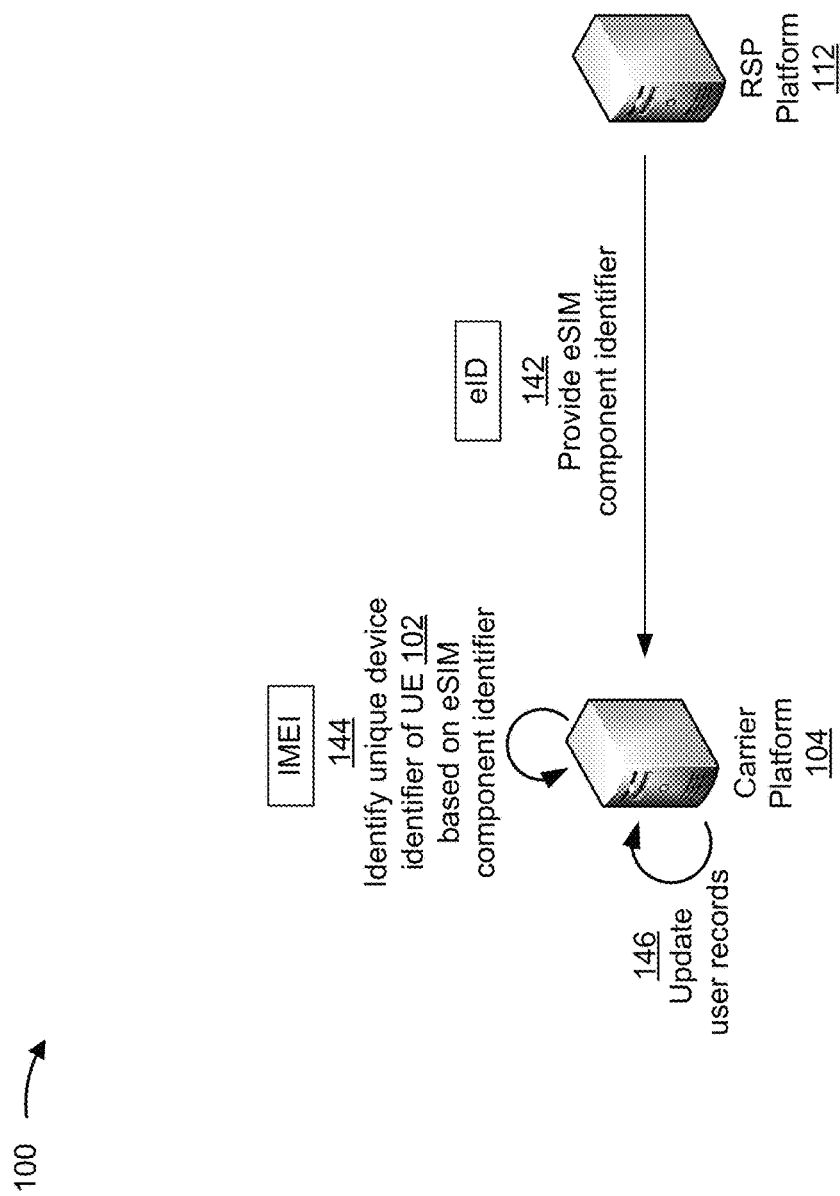

As shown in FIG. 1E, and by reference number 142, RSP platform 112 may provide the eSIM component identifier to carrier platform 104. For example, RSP platform 112 may provide the eSIM component identifier to carrier platform 104 as part of a notification that indicates that the eSIM profile has been activated on the eSIM of UE 102.

As shown by reference number 144, carrier platform 104 may identify the unique device identifier of UE 102 based on the eSIM component identifier. For example, carrier platform 104 may identify the unique device identifier of UE 102 by using the eSIM component identifier to reference a data structure that associates the eSIM component identifier and the unique device identifier of UE 102. The unique device identifier may include an international mobile equipment identity (IMEI) and/or any other identifier capable of uniquely identifying UE 102.

As shown by reference number 146, carrier platform 104 may update one or more records associated with the account of the user. For example, carrier platform 104 may update contents of another data structure that is used to store one or more records associated with the account of the user. In this case, carrier platform 104 may use the other data structure to associate the unique device identifier, the eSIM component identifier, the eSIM profile identifier, the one or more other unique device identifiers (e.g., the MDN), and/or the like.

In some implementations, one or more implementations described herein may be applied to a number sharing situation, where UE 102 and one or more companion UEs 102 share the same MDN. For example, the user may purchase a second UE 102 that includes a second eSIM. In this case, the second UE 102 (and/or UE 102) may perform one or more actions that are described herein as being performed by UE 102. As an example, UE 102 may (e.g., using a camera component) capture device model information of the second UE 102 (e.g., which may be visible on a bar code or on part of the second UE 102). In this example, UE 102 may provide carrier platform 104 with an activation request and may receive, from carrier platform 104, an activation response that includes a second eSIM profile identifier for a second eSIM profile that is compatible with a second eSIM of the second UE 102, the MDN of UE 102 (e.g., which will be shared with the second UE 102), and location information that is to be used to identify eSIM profile configuration data for the second eSIM profile. Additionally, UE 102 may provide RSP platform 112 with a configuration request and receive, from RSP platform 112, a configuration response that includes the eSIM profile configuration data for the second eSIM profile. This may allow UE 102 to provide the second UE 102 with the eSIM profile configuration for the second eSIM profile to allow the second UE 102 to configure the second eSIM with the second eSIM profile.

In this way, UE 102 (and/or one or more other devices described herein) causes the eSIM to be configured with the eSIM profile. By causing the eSIM to be configured with the eSIM profile using the one or more interfaces (e.g., APIs) described herein, UE 102 efficiently and/or effectively utilizes resources of UE 102 and/or resources of other platforms and/or devices, such as by conserving resources (e.g., processing resources, network resources, memory resources, and/or the like) that would otherwise be used to transmit the unique device identifier of UE 102 over a network, by reducing a number of over the air transmissions made by devices used to configure the eSIM (e.g., relative to an inferior solution that does not use one or more application programming interfaces (APIs) described herein to send and/or receive data, relative to an inferior solution that uses the unique device identifier as part of the activation procedure, and/or the like), and/or the like.

As indicated above, FIGS. 1A-1E are provided as one or more examples. Other examples can differ from what is described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple and/or distributed devices. Additionally, or alternatively, a set of devices (e.g., one or more devices) included in the one or more example implementations 100 may perform one or more functions described as being performed by another set of devices included in the one or more example implementations 100.

Figure 2:
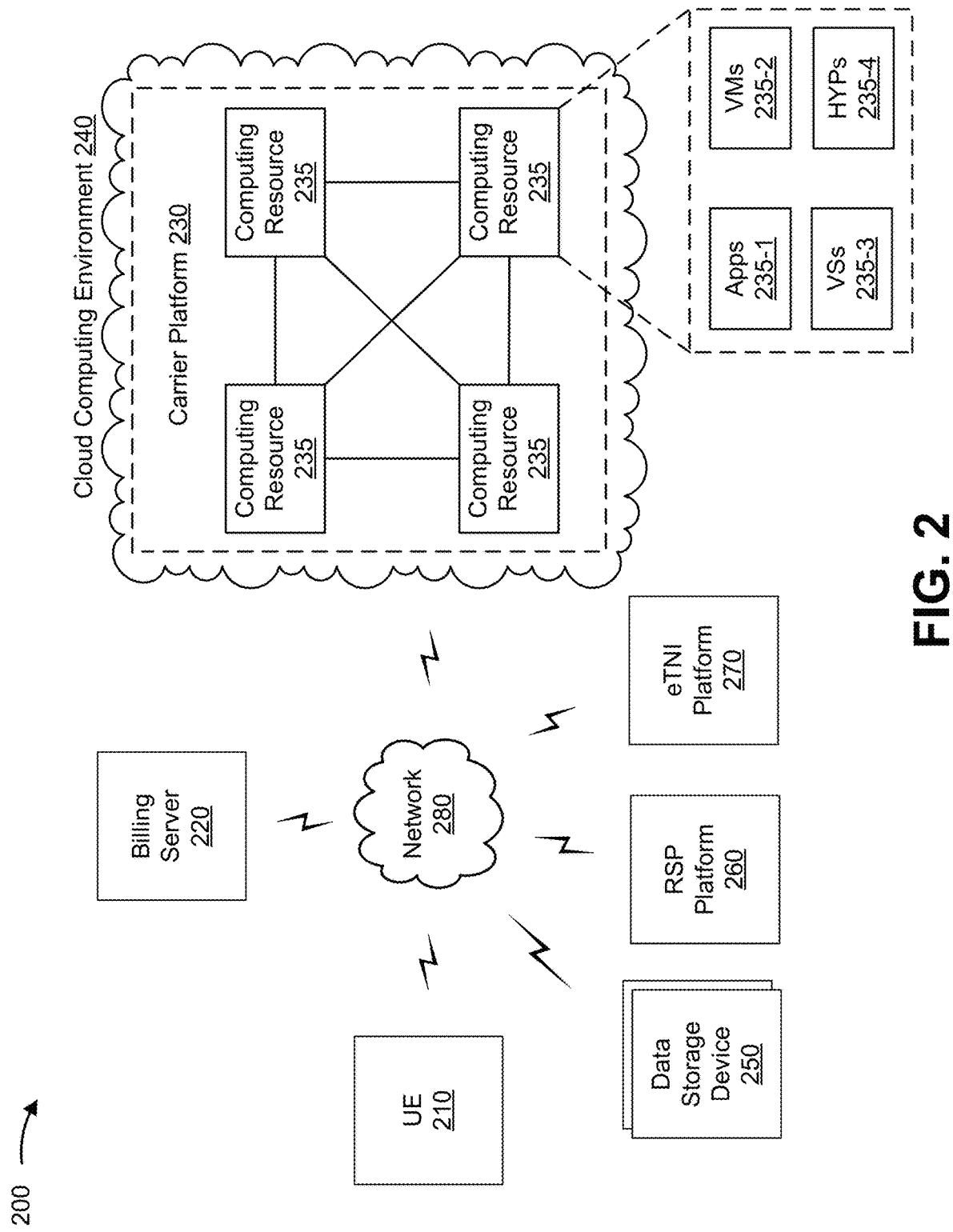
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user equipment (UE) 210, a billing server 220, a carrier platform 230 hosted within a cloud computing environment 240, a data storage device 250, a remote subscriber identity module (SIM) provisioning (RSP) platform 260, an electronic telephone number inventory (eTNT) platform 270, and/or a network 280. Devices of environment 200 may interconnect via wired connections, wireless connections, or a combination of wired and wireless connections.

UE 210 includes one or more devices capable of receiving, storing, generating, processing, and/or providing information associated with activating and/or configuring an embedded SIM (eSIM). For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a machine-to-machine (M2M) device, an internet of things (IoT) device, and/or a similar device.

In some implementations, UE 210 may include an eSIM. As used herein, an eSIM may include an embedded universal integrated circuit card (EUICC), and embedded integrated circuit card (EICC), a secure element, a virtual SIM, and/or the like. Additionally, or alternatively, UE 210 may include a device information application (e.g., an application capable of generating and/or identifying device model information of UE 210), a carrier application, and/or the like. The carrier application may include an application capable of interfacing UE 210 with carrier platform 230, an application capable of registering a user for one or more services, an application capable of capturing and/or displaying account information of a user, and/or the like.

In some implementations, UE 210 may have access to one or more interfaces of a group of interfaces described in connection with FIGS. 1A-1E. For example, UE 210 may use a first interface to allow a carrier application of UE 210 to communicate with a device information application of UE 210, may use a second interface to provide an activation request to carrier platform 230, may use the second interface to receive an activation response from carrier platform 230, may use a third interface to obtain an eSIM profile identifier (e.g., an ICCID), may use a fourth interface to provide RSP platform 260 with a configuration request, and may use the fourth interface to receive a configuration response from RSP platform 260.

Billing server 220 includes one or more devices capable of receiving, storing, generating, processing, and/or providing information associated with an account of a user. For example, billing server 220 may include a server device or a group of server devices. In some implementations, billing server 220 may receive new account information for the account of the user. In some implementations, billing server 220 may have access to a data structure that is used to store account information for the account of the user. In some implementations, billing server 220 may provide the account information to carrier platform 230.

Carrier platform 230 includes one or more devices capable of receiving, storing, generating, processing, and/or providing information associated with activating and/or configuring an eSIM. For example, carrier platform 230 may include a server device (e.g., a host server, a web server, an application server, etc.), a data center device, or a similar device.

In some implementations, carrier platform 230 may have access to one or more of the group of interfaces described in connection with FIGS. 1A-1E. For example, carrier platform 230 may use the second interface to receive the activation request from UE 210, may use the third interface to obtain an eSIM profile identifier and one or more device identifiers from eTNI platform 270, may use a fifth interface to communicate with RSP platform 260 to cause the eSIM profile configuration data to be accessible to UE 210. In some implementations, two or more interfaces, of the group of interfaces, may be implemented as a single interface.

In some implementations, as shown, carrier platform 230 may be hosted in cloud computing environment 240. While implementations described herein describe carrier platform 230 as being hosted in cloud computing environment 240, in some implementations, carrier platform 230 might not be cloud-based (i.e., may be implemented outside of a cloud computing environment) or may be partially cloud-based.

Cloud computing environment 240 includes an environment that hosts carrier platform 230. Cloud computing environment 240 may provide computation, software, data access, storage, etc. services that do not require end-user knowledge of a physical location and configuration of system(s) and/or device(s) that hosts carrier platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host carrier platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by UE 210, billing server 220, data storage device 250, RSP platform 260, and/or eTNI platform 270. Application 235-1 may eliminate a need to install and execute the software applications on these devices. For example, application 235-1 may include software associated with carrier platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., UE 210, billing server 220, data storage device 250, RSP platform 260, and/or eTNT platform 270), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Data storage device 250 includes one or more devices capable of receiving, storing, generating, processing, and/or providing traffic associated with activating and/or configuring an eSIM. For example, data storage device 250 may include a server device or a group of server devices. In some implementations, data storage device 250 may use a data structure to store device stock keeping unit (SKU) information in association with device model information and with eSIM profile SKU information. In some implementations, a first data storage device 250 may use a data structure to store the device SKU information in association with the device model information. Additionally, or alternatively, a second data storage device 250 may use a data structure to store the device SKU information in association with the eSIM profile SKU information.

RSP platform 260 includes one or more devices capable of receiving, storing, generating, processing, and/or providing information associated with activating and/or configuring an eSIM. For example, RSP platform 260 may include a server device or a group of server devices. In some implementations, RSP platform 260 may have access to one or more of the group of interfaces described in connection with FIGS. 1A-1E. For example, RSP platform 260 may use the fourth interface to communicate with UE 210 to provide UE 210 with the eSIM profile configuration data and may use the fifth interface to communicate with carrier platform 230 to cause the eSIM profile configuration data to be accessible to UE 210.

eTNT platform 270 includes one or more devices capable of receiving, generating, processing, and/or providing traffic associated with activating and/or configuring an eSIM. For example, eTNI platform 270 may include a server device or a group of server devices. In some implementations, eTNT platform 270 may use one or more data structures to store available MDNs, available eSIM profile identifiers, and/or the like. In some implementations, another platform or server (other than eTNT platform 270) may be used to store the available MDNs, the available eSIM profile identifiers, and/or the like. For example, a platform or server associated with a cloud service provider may be used to store the available MDNs, the available eSIM profile identifiers, and/or the like.

Network 280 includes one or more wired and/or wireless networks. For example, network 280 may include a telecommunications network (e.g., a fifth generation (5G) network, a fourth generation (4G) network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a packet switched network (PSN), a multiprotocol label switching (MPLS) network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
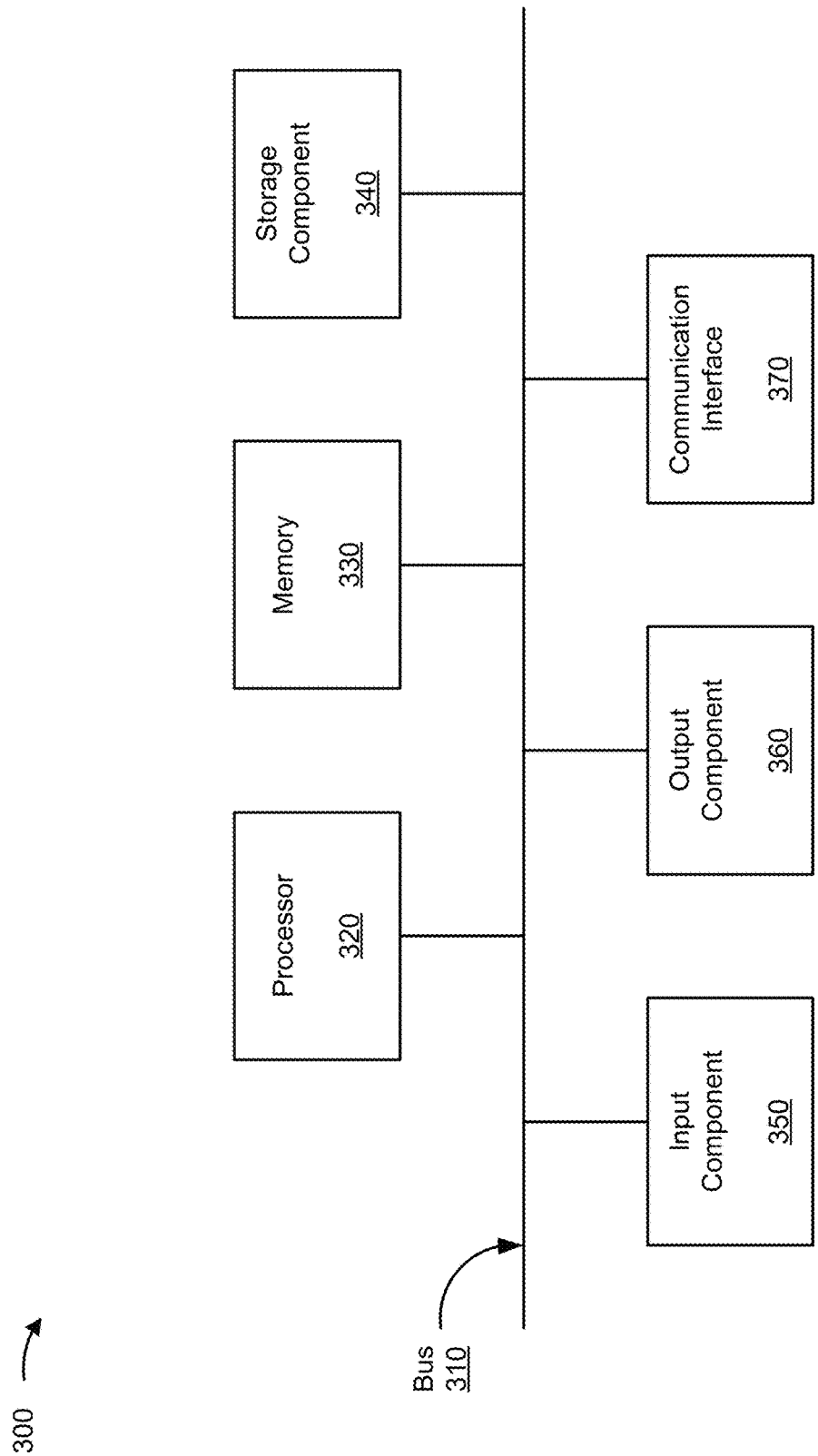
FIG. 3 is a diagram of example components of one or more devices of FIG. 2.

FIG. 3 is a diagram of example components of a device 300. Device 300 may correspond to UE 210, billing server 220, carrier platform 230, data storage device 250, RSP platform 260, and/or eTNI platform 270. In some implementations, UE 210, billing server 220, carrier platform 230, data storage device 250, RSP platform 260, and/or eTNI platform 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
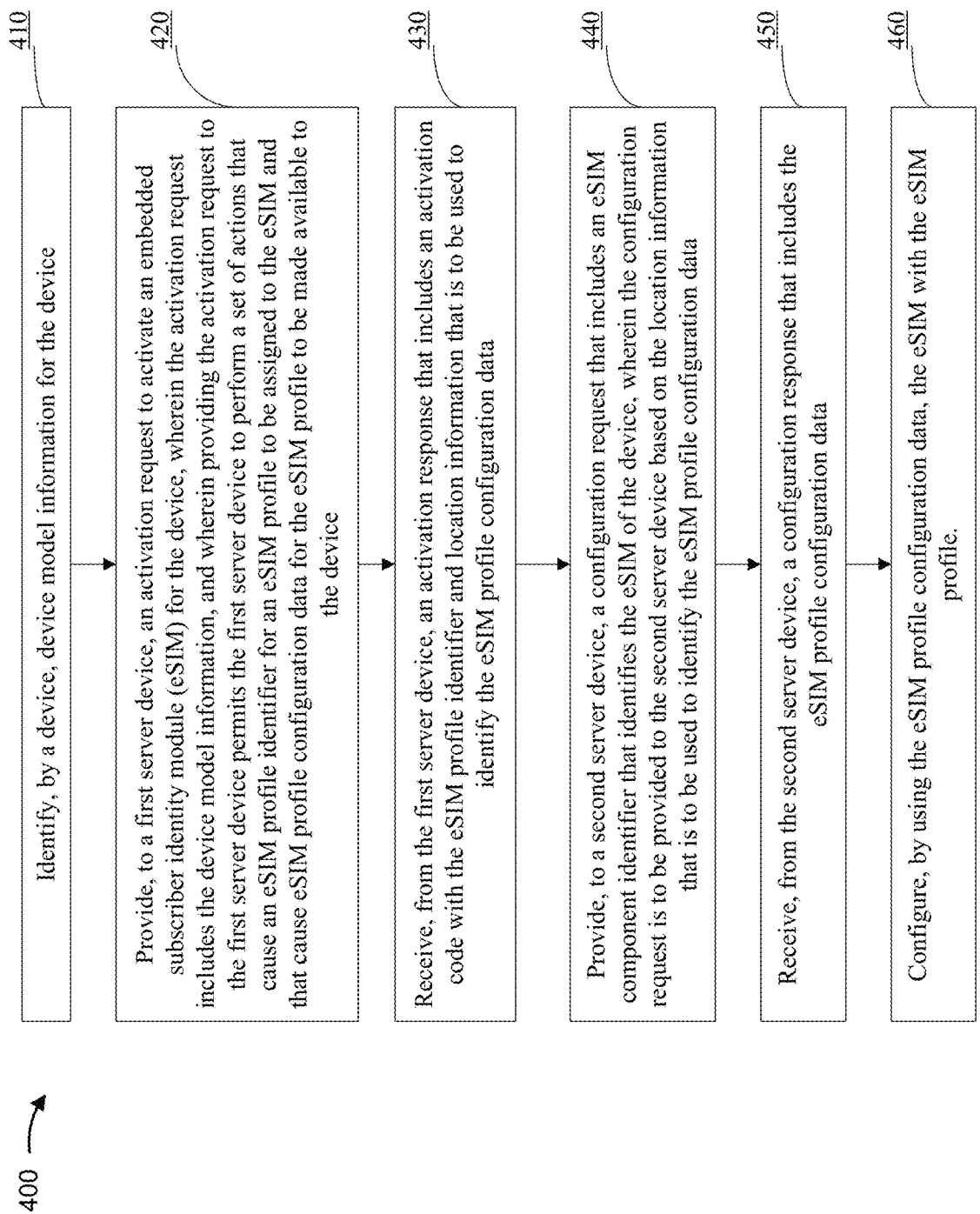
FIGS. 4 and 5 are flowcharts of one or more example processes for remote activation of an embedded subscriber identity module (eSIM).

FIG. 4 is a flow chart of an example process 400 for methods and/or systems for remote activation of an embedded subscriber identity module (eSIM). In some implementations, one or more process blocks of FIG. 4 may be performed by a device (e.g., a user equipment (UE) 210). In some implementations, one or more process blocks of FIG. 4 may be performed by another device or a group of devices separate from or including the device, such as a billing server (e.g., billing server 220), a carrier platform (e.g., carrier platform 230), a data storage device (e.g., data storage device 250), a remote SIM provisioning (RSP) platform (e.g., RSP platform 260), an electronic telephone number inventory (eTNI) platform (e.g., eTNI platform 270), and/or the like.

As shown in FIG. 4, process 400 may include identifying, by a device, device model information for the device (block 410). For example, the device (e.g., UE 210, using processor 320, memory 330, storage component 340, input component 350, communication interface 370, and/or the like) may identify device model information for the device, as described above.

In some implementations, the device model information may exclude a unique identifier of the device. For example, the device model information may exclude an international mobile equipment identity (IMEI) of the device. In some implementations, the device model information may generically identify the device. In some implementations, the device model information may include at least one of: information that identifies a device model, or information that identifies a version associated with the device model.

In some implementations, the device may determine that a trigger condition has been satisfied. In some implementations, the device may identify the device model information based on determining that the trigger condition has been satisfied. The trigger condition may include at least one of: a first indication that a boot-up procedure of the device has been completed, a second indication that a carrier application has been launched on the device, a third indication that a user has logged into an account that the user has with a service provider.

In some implementations, the device may cause a carrier application to use an application programming interface (API) to provide a device model information request to another application to cause the other application to reference a data structure to identify the device model information. The carrier application and the other application may both be executed on the device.

As further shown in FIG. 4, process 400 may include providing, to a first server device, an activation request to activate an embedded subscriber identity module (eSIM) for the device, wherein the activation request includes the device model information, and wherein providing the activation request to the first server device permits the first server device to perform a set of actions that cause an eSIM profile identifier for an eSIM profile to be assigned to the eSIM and that cause eSIM profile configuration data for the eSIM profile to be made available to the device (block 420). For example, the device (e.g., UE 210, using processor 320, memory 330, storage component 340, output component 360, communication interface 370, and/or the like) may provide, to a first server device (e.g., carrier platform 230), an activation request to activate an eSIM for the device, as described above. In some implementations, the activation request may include the device model information. In some implementations, providing the activation request to the first server device may permit the first server device to perform a set of actions that cause an eSIM profile identifier for an eSIM profile to be assigned to the eSIM and that cause eSIM profile configuration data for the eSIM profile to be made available to the device.

In some implementations, the device may provide, as part of the activation request, the device model information and an account identifier for an account associated with a user. The device model information may be used by the first server device to cause the eSIM profile identifier to be assigned to the eSIM. The account identifier may be used by the first server device to cause the eSIM profile configuration data for the eSIM profile to be made available to the device.

In some implementations, the device may receive, based on an interaction with a user interface of the device, account information associated with an account of a user. In some implementations, when providing the activation request, the device may provide the account information to the first server device as part of the activation request. In some implementations, providing the account information to the first server device may permit the first server device to use the account information to obtain services data (e.g., services package data) that is to be included in the eSIM profile configuration data and that identifies a set of services that are linked to the account of the user.

As further shown in FIG. 4, process 400 may include receiving, from the first server device, an activation response that includes an activation code with the eSIM profile identifier and location information that is to be used to identify the eSIM profile configuration data (block 430). For example, the device (e.g., UE 210, using processor 320, memory 330, storage component 340, input component 350, communication interface 370, and/or the like) may receive, from the first server device, an activation response that includes an activation code with the eSIM profile identifier and location information that is to be used to identify the eSIM profile configuration data, as described above.

In some implementations, the location information may include a fully qualified domain name (FQDN). In some implementations, the location information may include domain information (e.g., that includes a domain name).

As further shown in FIG. 4, process 400 may include providing, to a second server device, a configuration request that includes an eSIM component identifier that identifies the eSIM of the device, wherein the configuration request is provided to the second server device based on the location information that is to be used to identify the eSIM profile configuration data (block 440). For example, the device (e.g., UE 210, using processor 320, memory 330, storage component 340, output component 360, communication interface 370, and/or the like) may provide, to a second server device (e.g., RSP platform 260), a configuration request that includes an eSIM component identifier that identifies the eSIM of the device, as described above. In some implementations, the device may identify the eSIM component identifier that is to be included in the configuration request by referencing a data structure local to the device. In some implementations, the configuration request may be provided to the second server device based on the location information that is to be used to identify the eSIM profile configuration data. For example, the device may use a FQDN to visit a website that is used to display and/or store profile data for users, which may allow the second server device to use the eSIM profile identifier (e.g., an ICCID) to identify the eSIM.

As further shown in FIG. 4, process 400 may include receiving, from the second server device, a configuration response that includes the eSIM profile configuration data (block 450). For example, the device (e.g., UE 210, using processor 320, memory 330, storage component 340, input component 350, communication interface 370, and/or the like) may receive, from the second server device, a configuration response that includes the eSIM profile configuration data, as described above.

As further shown in FIG. 4, process 400 may include configuring, by using the eSIM profile configuration data, the eSIM with the eSIM profile (block 460). For example, the device (e.g., UE 210, using processor 320, memory 330, storage component 340, and/or the like) may configure, by using the eSIM profile configuration data, the eSIM with the eSIM profile, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
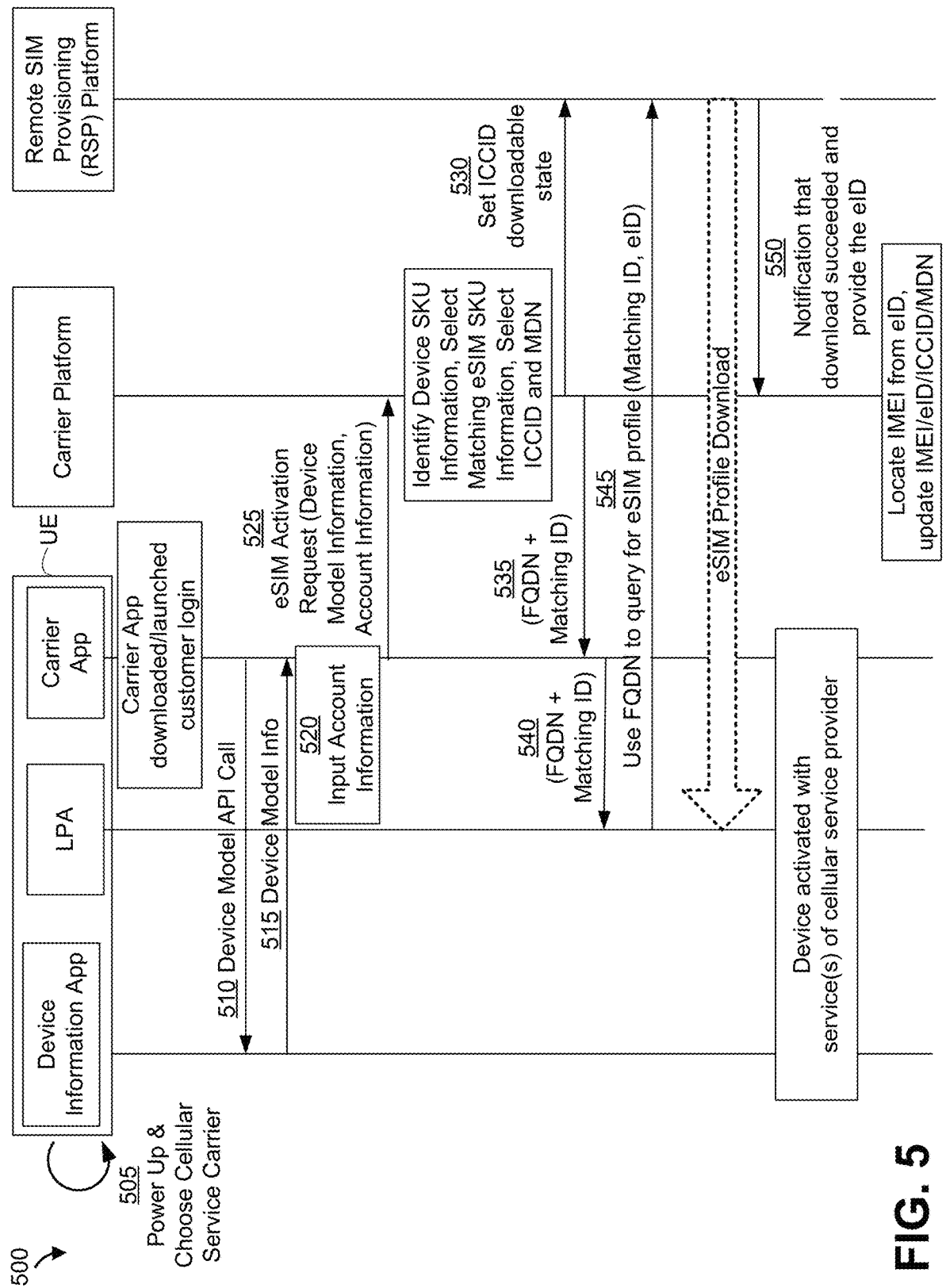

FIG. 5 is a data flow diagram of an example process 500 for methods and/or systems for remote activation of an embedded subscriber identity module (eSIM). As shown in FIG. 5, and by reference number 505, a user equipment (UE) may power up and a user may interact with the UE to choose a cellular service carrier. As shown by reference number 510, a carrier application of the UE may identify device model information of the UE by making a device model application programming interface (API) call to a device information application of the UE. As shown by reference number 515, the device information application of the UE may provide the device model information to the carrier application (e.g., based on device model API call). As shown by reference number 520, a user may input account information into an interface of the carrier application.

As shown by reference number 525, the carrier application of the UE may provide, to a carrier platform, an eSIM activation request that includes the device model information and/or the account information of the user. In this case, the carrier platform may identify device SKU information, may select matching eSIM SKU information, and may select an integrated circuit card identifier (ICCID) and a mobile directory number (MDN) for the UE.

As shown by reference number 530, the carrier platform may interact with a remote SIM provisioning (RSP) platform to set the ICCID to a downloadable state. In some implementations, the RSP platform may, while setting the ICCID to a downloadable state, generate a matching ID. As an example, the RSP platform may generate a matching ID that is represented by the string KTHAMX2EIC4KSULD.

As shown by reference number 535, the carrier platform may provide a fully qualified domain name (FQDN) and/or the matching ID to the carrier application of the UE. For example, the carrier platform may provide an activation code that includes the FQDN and the matching ID. As a specific example, the carrier platform may provide the carrier application of the UE with the following activation code: LPA:1$xyz.prod.ondemandconnectivity.com$ KTHAMX2EIC4KSULD. In this example, the FQDN may be the text located before the second dollar sign (LPA: 1$xyz.prod.ondemandconnectivity.com) and the match ID may be the text after the second dollar sign (KTHAMX2EIC4KSULD).

As shown by reference number 540, the carrier application of the UE may provide, to a logical profile assistant (LPA) of the UE, the FQDN and/or the matching ID. As shown by reference number 545, the LPA of the UE may interact with the RSP platform to query for the eSIM profile. For example, the LPA of the UE may use the FQDN to identify a website hosted by the RSP platform and may query for the eSIM profile by providing the RSP platform with the matching ID and/or an embedded identifier (eID) that identifies the eSIM of the UE. As shown in FIG. 5, the UE may, based on the query, download the eSIM profile for the eSIM. In this case, the UE may configure the eSIM with the eSIM profile to activate one or more services of the cellular service provider. As shown by reference number 550, the RSP platform may notify the carrier platform that the download succeeded and may provide the carrier platform with the eID. This may allow the carrier platform to use the eID to locate a unique device identifier of the UE (e.g., an international mobile equipment identity (IMEI)) and to associate the eID, the unique device identifier, the ICCID, and MDN, and/or the like.

Although FIG. 5 shows example operations of process 500, in some implementations, process 500 may include additional operations, fewer operations, different operations, or differently arranged operations than those depicted in FIG. 5. Additionally, or alternatively, two or more of the operations of process 500 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a device, device model information for the device;
   providing, by the device and to a first server device, an activation request to activate an embedded subscriber identity module (eSIM) for the device,
      wherein the activation request includes the device model information, and
      wherein providing the activation request to the first server device permits the first server device to perform a set of actions that cause an eSIM profile identifier for an eSIM profile to be assigned to the eSIM and that cause eSIM profile configuration data for the eSIM profile to be made available to the device;
   receiving, by the device and from the first server device, an activation response that includes an activation code with the eSIM profile identifier and location information that is to be used to identify the eSIM profile configuration data;
   providing, by the device and to a second server device, a configuration request that includes an eSIM component identifier that identifies the eSIM of the device,
      wherein the configuration request is provided to the second server device based on the location information that is to be used to identify the eSIM profile configuration data;
   receiving, by the device and from the second server device, a configuration response that includes the eSIM profile configuration data; and
   configuring, by the device and by using the eSIM profile configuration data, the eSIM with the eSIM profile.

2. The method of claim 1, wherein the device model information excludes a unique identifier of the device.

3. The method of claim 1, wherein the device model information includes at least one of:
   information that identifies a device model, or
   information that identifies a version associated with the device model.

4. The method of claim 1, further comprising:
   determining that a trigger condition has been satisfied,
      wherein the trigger condition includes at least one of:
         a first indication that a boot-up procedure of the device has been completed,
         a second indication that a carrier application has been launched on the device, or
         a third indication that a user has logged into an account that the user has with a service provider; and
   wherein identifying the device model information comprises:
      identifying the device model information based on determining that the trigger condition has been satisfied.

5. The method of claim 1, wherein identifying the device model information comprises:
   causing a carrier application to use an application programming interface (API) to provide a device model information request to another application to cause the other application to reference a data structure to identify the device model information,
wherein the carrier application and the other application are both being executed on the device.

6. The method of claim 1, wherein the location information includes a fully qualified domain name (FQDN).

7. The method of claim 1, wherein providing the activation request comprises:
providing, as part of the activation request, the device model information and an account identifier for an account associated with a user,
wherein the device model information is to be used by the first server device to cause the eSIM profile identifier to be assigned to the eSIM, and
wherein the account identifier is to be used by the first server device to cause the eSIM profile configuration data for the eSIM profile to be made available to the device.

8. A device, comprising:
an embedded subscriber identity module (eSIM);
one or more memories; and
one or more processors, operatively coupled to the one or more memories, to:
determine that the eSIM is to be activated based on a trigger condition being satisfied;
identify device model information for the device that is to be used to activate the eSIM;
provide, to a first server device, an activation request to activate the eSIM,
wherein the activation request includes the device model information, and
wherein providing the activation request to the first server device permits the first server device to perform a set of actions that cause an eSIM profile identifier for an eSIM profile to be assigned to the eSIM and that cause eSIM profile configuration data for the eSIM profile to be made available to the device;
receive, from the first server device, an activation response that includes an activation code with the eSIM profile identifier and location information that is to be used to identify the eSIM profile configuration data;
obtain eSIM profile configuration data from a second server device,
wherein the eSIM profile configuration data is obtained based on the location information being used to provide the second server device with the eSIM profile identifier and an eSIM component identifier that identifies the eSIM; and
configure the eSIM with the eSIM profile using the eSIM profile configuration data.

9. The device of claim 8, wherein the trigger condition includes at least one of:
a first indication that a boot-up procedure of the device has been completed,
a second indication that a carrier application has been launched on the device, or
a third indication that a user has logged into an account that the user has with a service provider.

10. The device of claim 8, wherein the device model information excludes an international mobile equipment identity (IMEI) of the device.

11. The device of claim 8, wherein the device model information includes at least one of:
information that identifies a device model, or
information that identifies a version associated with the device model.

12. The device of claim 8, wherein the location information includes a domain name.

13. The device of claim 8, wherein the one or more processors, when identifying the device model information, are to:
cause a carrier application to use an application programming interface (API) to provide a device model information request to another application to cause the other application to reference a data structure to identify the device model information.

14. The device of claim 8, wherein the one or more processors are further to:
receive, based on an interaction with a user interface of the device, account information associated with an account of a user; and
wherein the one or more processors, when providing the activation request, are to:
provide the account information to the first server device as part of the activation request,
wherein providing the account information to the first server device permits the first server device to use the account information to obtain services data that is to be included in the eSIM profile configuration data and that identifies a set of services that are linked to the account of the user.

15. A non-transitory computer-readable medium storing instructions, the instructions comprising:
one or more instructions that, when executed by one or more processors of a user equipment (UE), cause the one or more processors to:
identify device model information for the UE,
wherein the device model information generically identifies the UE;
provide the device model information to a first server device to permit the first server device to perform a set of actions that cause an embedded subscriber identity module (eSIM) profile identifier for an eSIM profile to be assigned to an eSIM of the device and that cause eSIM profile configuration data for the eSIM profile to be made available to the device;
receive, from the first server device, an activation code with the eSIM profile identifier and location information that identifies is to be used to identify the eSIM profile configuration data;
provide, to a second server device, the eSIM profile identifier and an eSIM component identifier that identifies the eSIM of the UE,
wherein the second server device is provided with the eSIM profile identifier and the eSIM component identifier based on the location information that is to be used to identify the eSIM profile configuration data;
receive the eSIM profile configuration data from the second server device; and
configure the eSIM with the eSIM profile using the eSIM profile configuration data.

16. The non-transitory computer-readable medium of claim 15, wherein the device model information includes at least one of:
information that identifies a device model, or
information that identifies a version associated with the device model.

17. The non-transitory computer-readable medium of claim 15, wherein the one or more instructions, when executed by the one or more processors, further cause the one or more processors to:

determine that a trigger condition has been satisfied; and wherein the one or more instructions, that cause the one or more processors to identify the device model information, cause the one or more processors to:

identify the device model information based on determining that the trigger condition has been satisfied.

18. The non-transitory computer-readable medium of claim 15, wherein the location information includes domain information.

19. The non-transitory computer-readable medium of claim 15, wherein the one or more instructions, when executed by the one or more processors, further cause the one or more processors to:

identify the eSIM component identifier by referencing a data structure local to the UE.

20. The non-transitory computer-readable medium of claim 15, wherein the one or more instructions, that cause the one or more processors to provide the activation request, cause the one or more processors to:

provide, as part of the activation request, the device model information and an account identifier for an account associated with a user, wherein the device model information is to be used by the first server device to cause the eSIM profile identifier to be assigned to the eSIM, and wherein the account identifier is to be used by the first server device to obtain services data that identifies a set of services that are linked to the account of the user and that is to be included in the eSIM profile configuration data.

* * * * *